(12) United States Patent
Nakamura (10) Patent No.: US 6,733,180 B2
(45) Date of Patent: May 11, 2004

(54) METHOD OF MANUFACTURING DYNAMIC PRESSURE BEARING DEVICE, AND DYNAMIC PRESSURE BEARING DEVICE (75) Inventor: Junichi Nakamura, Ozu (JP)

(73) Assignee: Matsushita Electric Industrial Co., Ltd. (JP)

( * ) Notice: Subject to any disclaimer, the term of this patent is extended or adjusted under 35 U.S.C. 154(b) by 57 days.

(21) Appl. No.: 10/203,035

(22) PCT Filed: Nov. 26, 2001

(86) PCT No.: PCT/JP01/10299

§ 371 (c)(1),
(2), (4) Date: Aug. 5, 2002

(87) PCT Pub. No.: WO02/48564

PCT Pub. Date: Jun. 20, 2002

(65) Prior Publication Data

US 2003/0012465 A1 Jan. 16, 2003

(30) Foreign Application Priority Data

Dec. 11, 2000  (JP) .......................... 2000-375335

(51) Int. Cl.[7] .......................... F16C 32/06; F16N 11/10; B65B 31/00
(52) U.S. Cl. .......................... 384/100; 184/58; 384/107; 384/114; 141/4
(58) Field of Search ................................. 384/100, 107, 384/114; 184/58; 141/4, 7

(56) References Cited

U.S. PATENT DOCUMENTS

| 5,067,528 A | * 11/1991 | Titcomb et al. ................. 141/4 |
| 5,524,728 A | 6/1996 | Williams et al. ............... 184/29 |
| 5,601,125 A | * 2/1997 | Parsoneault et al. ........... 141/51 |
| 5,778,948 A | * 7/1998 | Gomyo et al. ............... 384/133 |
| 5,894,868 A | * 4/1999 | Wuester, Sr. .................... 141/4 |
| 6,066,903 A | 5/2000 | Ichiyama ..................... 310/90 |
| 6,305,439 B1 | * 10/2001 | Pool et al. ........................ 141/4 |

FOREIGN PATENT DOCUMENTS

| JP | 10-184691 | 7/1998 |
| JP | 2000-297818 | 10/2000 |
| JP | 2001-27242 | 1/2001 |
| JP | 2002-5170 | 1/2002 |

* cited by examiner

Primary Examiner—Thomas R. Hannon
(74) Attorney, Agent, or Firm—Parkhurst & Wendel, L.L.P.

(57) ABSTRACT

To provide a manufacturing method of a dynamic pressure bearing device and a dynamic pressure bearing device to inject a proper amount of lubricating oil to a bearing unit by using a simple process without leaving air bubbles in the bearing unit. The bearing unit is exposed in an atmosphere of reduced pressure such as in a vacuum chamber or the like to evacuate air in a gap between a shaft body and a bearing. The proper amount of lubricating oil is dropped to an open end of the gap of the bearing unit by using a dispenser. The bearing unit is released to an atmospheric air to fill the lubricating oil into a gap of the bearing unit.

7 Claims, 8 Drawing Sheets

PRIOR ART

METHOD OF MANUFACTURING DYNAMIC PRESSURE BEARING DEVICE, AND DYNAMIC PRESSURE BEARING DEVICE

TECHNICAL FIELD

The present invention relates to a dynamic pressure bearing device used for a magnetic disk drive or the like, and to a method for manufacturing the same.

BACKGROUND ART

Figure 8:
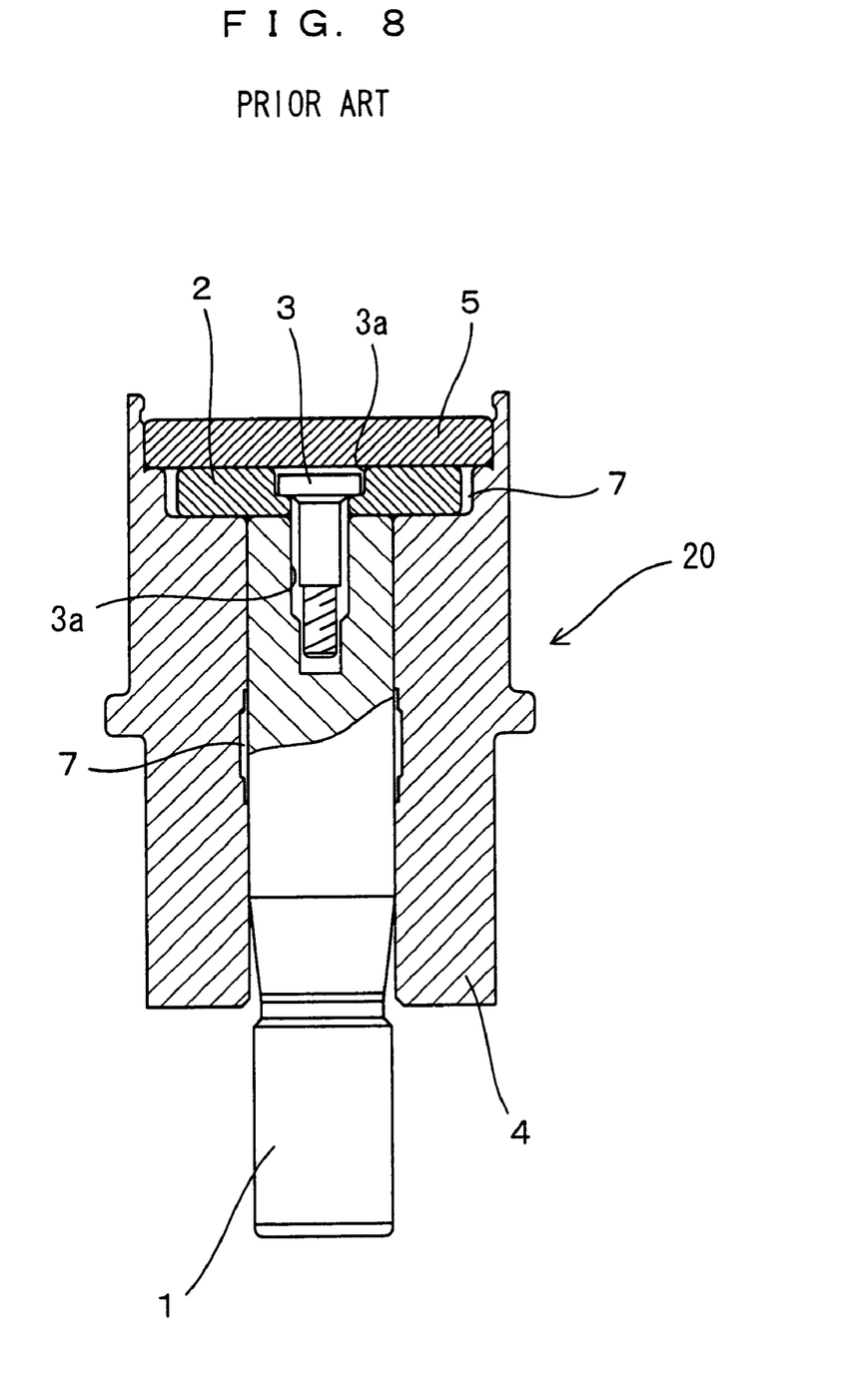
FIG. 8 is a longitudinal sectional view showing a conventional dynamic pressure bearing device.

As shown in FIG. 8, a dynamic pressure bearing device is used for a magnetic disk drive or the like. The bearing has lubricating oil 7 filled in a gap between a bearing body and a shaft body that constitute a bearing unit 20.

The bearing unit 20 is constituted as follows: on a shaft 1 serving as a shaft body, a thrust flange 2 is fixed by a screw 3, the shaft 1 is inserted into a shaft body insertion hole of a sleeve 4 serving as a bearing body, and a thrust plate 5 is bonded to the sleeve 4 so as to be opposed to the thrust flange 2.

On at least one of the outer periphery of the shaft 1 and the inner periphery of the sleeve 4, a dynamic pressure generating groove is formed to constitute a radial bearing, and dynamic pressure generating grooves are formed at any two places on the end faces of the thrust flange 2, the thrust plate 5, and the sleeve 4 to constitute a-thrust bearing.

The lubricating oil 7 is injected in a gap between the bearing body and the shaft body of the bearing unit 20 configured thus to constitute the dynamic pressure bearing device.

As a method of injecting the lubricating oil 7 into the bearing unit 20, it is possible to adopt a method of injecting the lubricating oil 7 during assembly of the bearing unit 20, and a method of injecting the lubricating oil 7 after the bearing unit 20 is assembled. For example, the following method is generally used: before the shaft 1 is inserted into the sleeve 4, a prescribed amount of the lubricating oil 7 is dropped on the internal diameter of the sleeve 4, and then, the shaft 1 is inserted. Further, the following method is also generally used: after the inside of the assembled bearing unit 20 is evacuated, the end of the bearing unit 20 is dipped into the lubricating oil 7, and then, the bearing unit 20 is returned to an atmospheric pressure to inject the lubricating oil 7 into the bearing using a difference in atmospheric pressure.

However, in the method of injecting the lubricating oil 7 during assembly of the bearing unit 20, the air is prone to enter the bearing unit 20. When the entering air is expanded due to variations in temperature and atmospheric pressure, the lubricating oil 7 may leak to the outside. Moreover, motor characteristics may be degraded by the entering air. Furthermore, since the shaft 1 is inserted after the lubricating oil 7 is injected into the sleeve 4, there is a problem that it is difficult to pour the lubricating oil 7 into a screw hole 3a of the screw 3, which is used to fix the thrust flange 2 on the shaft 1.

Meanwhile, in the method of dipping the bearing unit 20 into the lubricating oil 7 after the assembled bearing unit 20 is evacuated, it is necessary to adjust an amount of the lubricating oil 7 to a prescribed amount after the lubricating oil 7 is injected into the bearing unit 20. Further, since at least the open end of the bearing unit 20 needs to be entirely dipped into the lubricating oil 7, the lubricating oil 7 which has adhered to the outer periphery of the bearing unit 20 by the dipping needs to be removed, resulting in an extremely complicated assembling process. Besides, for example, when a screw hole for attaching components is formed on a part of the bearing unit 20, it is not possible to remove the lubricating oil 7 in the screw hole, and the lubricating oil 7 is injected into the unit 20 with a larger amount than the prescribed amount, resulting in leakage or the like of the lubricating oil 7. Hence, it is not possible to obtain a satisfactory function as a product, and there is a problem that the above-described injecting methods cannot be used.

The present invention resolves the above problem and has as its object the provision of a manufacturing method of a dynamic pressure bearing device and a dynamic pressure bearing device whereby the above-described problems are solved and a proper amount of lubricating oil can be injected by using a simple process without leaving air bubbles in a bearing unit.

DISCLOSURE OF INVENTION

A method for manufacturing a dynamic pressure bearing device of the present invention in which lubricating oil is filled in a gap between a bearing body and a shaft body, the bearing body and the shaft body forming together a bearing unit, is characterized in that the bearing unit is exposed in an atmosphere of reduced pressure to evacuate air in the gap, a proper amount of lubricating oil is supplied to an open end of the gap of the bearing unit, and then, the bearing unit is released to an atmospheric air to fill the lubricating oil into the gap.

According to this configuration, it is possible to readily realize a dynamic pressure bearing device having a satisfactory motor characteristic such that lubricating oil can be filled without allowing the air to enter the bearing, and the lubricating oil does not leak to the outside even when there occur changes in temperature and atmospheric pressure.

Further, a ring-shaped concave part having a volume substantially equal to a proper amount of lubricating oil is formed at an open end of the gap of the bearing unit, and the lubricating oil is supplied into the ring-shaped concave part, so that the proper amount of lubricating oil can be readily supplied without short or excessive supply.

Further, a plurality of bearing units are placed on a pallet, and the pallet and a lubricating oil supply side are relatively moved to continuously supply the lubricating oil to the bearing units, thereby remarkably improving production efficiency.

Besides, since a dispenser having a nozzle applied with an oil repellent agent on a leading end thereof is used to supply lubricating oil, even in continuous lubrication of the lubricating oil, it is possible to prevent excessive adherence of the lubricating oil to the leading end of the nozzle, thereby accurately supplying the lubricating oil to the bearing unit.

A dynamic pressure bearing device of the present invention, in which lubricating oil is filled in a gap between a bearing body and a shaft body of a bearing unit having one end closed and the other end opened, is characterized in that a ring-shaped concave part having a volume substantially equal to a proper amount of oil is formed at an open end of the gap.

According to this configuration, since a prescribed amount of lubricating oil is filled in the bearing unit without allowing entry of air bubbles, it is possible to provide a device having a satisfactory motor characteristic.

Further, the ring-shaped concave part is formed at least in one of the shaft body and the bearing body, or the ring-shaped concave part may be constituted by a chamfered part formed all around an opening of a shaft body insertion hole of the bearing body, the chamfered part being positioned at the open end of the gap of the bearing unit, and a space formed at a position connected to the chamfered part and extending to a point where an outer periphery of the shaft body and an inner periphery of the bearing body are close to each other, whereby a sum of a chamfered volume of the chamfered part and a volume of the space is made substantially equal to the proper amount of lubricating oil. In addition, when ring-shaped grooves are formed on an open side of the bearing unit in order for preventing a spread of lubricating oil, it is possible to readily drop the prescribed amount of lubricating oil without causing adherence of the lubricating oil more than necessary onto the open end of the bearing unit.

BEST MODE FOR CARRYING OUT THE INVENTION

Hereinafter, referring to FIGS. 1 to 7, an embodiment of the present invention will be discussed in accordance with specific examples.

Besides, members configured as those of FIG. 8, which illustrates prior art, will be indicated by the same reference numerals.

Figure 1:
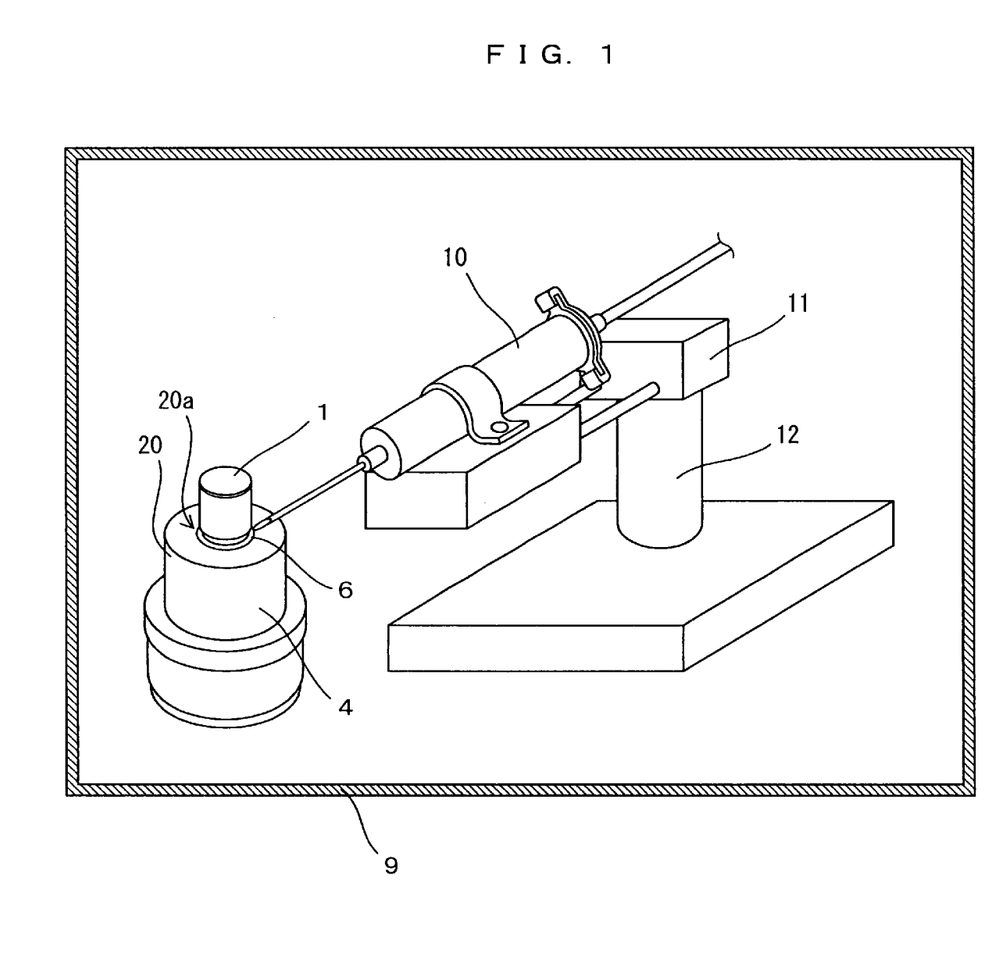
FIG. 1 is a schematic diagram for explaining a method of injecting lubricating oil into a bearing unit according to an embodiment of the present invention.

As shown in FIG. 1, the present embodiment is different from prior art in that lubricating oil is dropped to an open end 20a provided in a gap between a bearing body and a shaft body of a bearing unit 20 in a state in which the bearing unit 20 is exposed in an atmosphere of reduced pressure, and then, lubricating oil 7 is injected into the unit by using a pressure difference in an atmosphere of an atmospheric pressure.

To be specific, the bearing unit 20, which is assembled like FIG. 8 with one end being closed and the other end being opened, is placed in an atmosphere of reduced pressure, for example, in a vacuum chamber 9 or the like, and the gap of the bearing unit 20 is substantially evacuated to a vacuum.

In the vacuum chamber 9, as a device for supplying lubricating oil into the bearing unit 20, for example, a device is provided which comprises a component such as a dispenser 10 for dropping lubricating oil, a cylinder 11 for driving the dispenser 10, and a base 12 for fixing the cylinder 11. A prescribed amount of lubricating oil is dropped to the open end 20a of the gap of the bearing unit 20, that is, on the side of a sleeve 4 under a reduced pressure. The inside of the bearing unit 20 is substantially evacuated to a vacuum as described above. Here, the prescribed amount of lubricating oil is determined in view of thermal expansion, heat shrinkage, or the like of the components and lubricating oil under a service condition of the bearing unit 20, so as to prevent leakage and shortage of oil.

The lubricating oil dropped in the predetermined amount is held on the outer periphery of the shaft 1 and the end face of the sleeve 4 by surface tension, and is spread around the shaft 1 and the sleeve 4.

Figure 2:
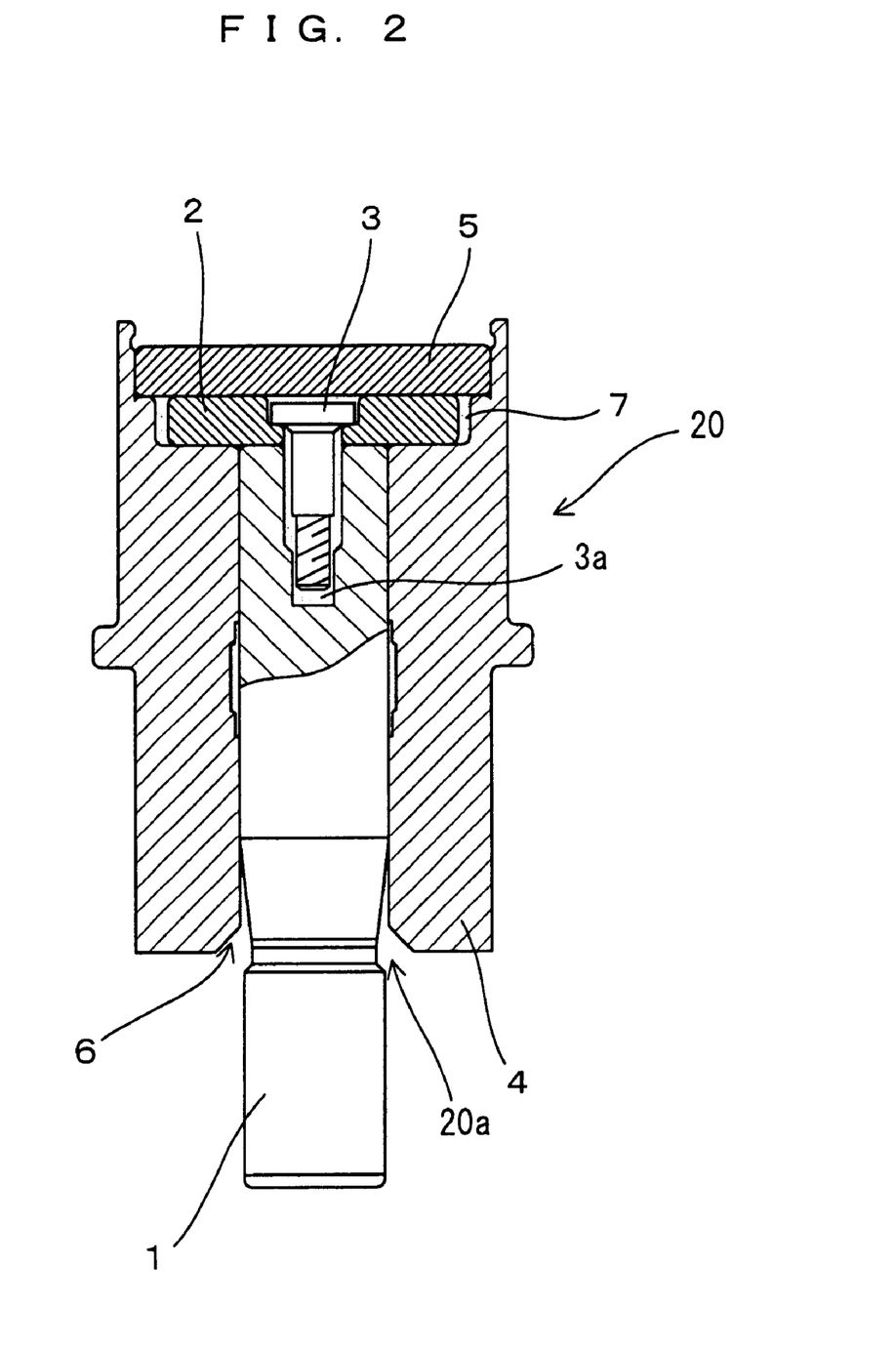
FIG. 2 is a longitudinal sectional view showing a dynamic pressure bearing device of the embodiment.

And then, when the inside of the vacuum chamber 9 is released to an atmospheric pressure while the lubricating oil 7 is held, as shown in FIG. 2, the lubricating oil 7 enters the gap in the bearing unit 20 due to a pressure difference between an internal pressure and an atmospheric pressure.

Such a manufacturing method of a dynamic pressure bearing device makes it possible to inject the lubricating oil 7 without leaving air bubbles in the bearing unit 20, and to prevent the lubricating oil 7 from flowing to the outside of the dynamic pressure bearing device even in the event of variations in temperature and, for example, variations in barometric pressure resulted from transportation of an aircraft.

Further, in addition to the gap between the bearing body and the shaft body, in the configuration where the shaft 1 and the thrust flange 2 are screwed, the lubricating oil 7 can be positively injected into the screw hole 3a as well. Moreover, even when the end face of the shaft 1 has a hole and a screw hole for mounting other members, the lubricating oil 7 can be readily injected in a short time.

Besides, the dropped lubricating oil 7 enters the inside of the bearing unit 20 simply by applying the lubricating oil 7 to the outer periphery of the shaft 1 and the end face of the sleeve 4 on the open end 20a of the bearing unit 20. Thus, unlike the prior art, the lubricating oil 7 does not excessively adhere to the open end of the bearing unit 20, thereby improving the quality of the bearing device.

Moreover, the dropped lubricating oil 7 enters the inside of the bearing unit 20 without overflowing to the outside. Thus, once the prescribed amount of the lubricating oil 7 is dropped, it is not necessary to adjust an amount of the lubricating oil 7 after injection.

Figure 3:
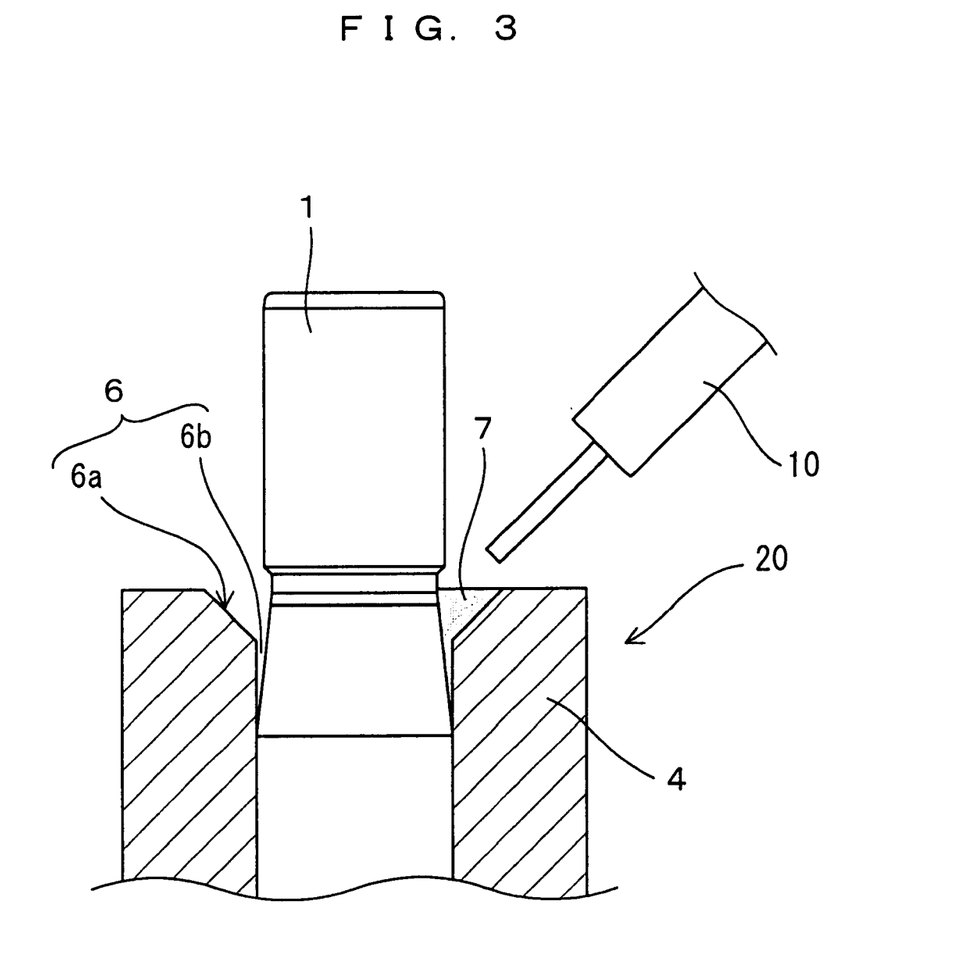
FIG. 3 is an enlarged sectional view for explaining a main part of FIG. 2.

In order to drop the prescribed amount of the lubricating oil 7, a ring-shaped concave part 6 is formed along the open end 20a of the bearing unit 20 with a volume substantially equal to the proper amount of oil, and the lubricating oil 7 is supplied into the ring-shaped concave part 6. The ring-shaped concave part 6 can be formed on at least one of the shaft 1 and the sleeve 4. As shown in FIG. 3, the concave part 6 is preferably constituted by a chamfered part 6a and a ring-shaped space 6b. The chamfered part 6a is positioned at the open end 20a of the gap of the bearing unit 20 and is formed around the opening of the shaft body insertion hole of the sleeve 4, and the space 6b is formed at a position connected to the chamfered part 6a to a point where the outer periphery of the shaft 1 and the inner periphery of the sleeve 4 are close to each other.

In this way, when the sum of a chamfering volume of the chamfered part 6a and a volume of the space 6b is substantially made equal to the proper amount of the lubricating oil 7, when the lubricating oil 7 is supplied from the dispenser 10, the prescribed amount of the lubricating oil 7 can be readily injected simply by dropping the lubricating oil 7 to the open end of the shaft insertion hole of the sleeve 4.

Figure 4:
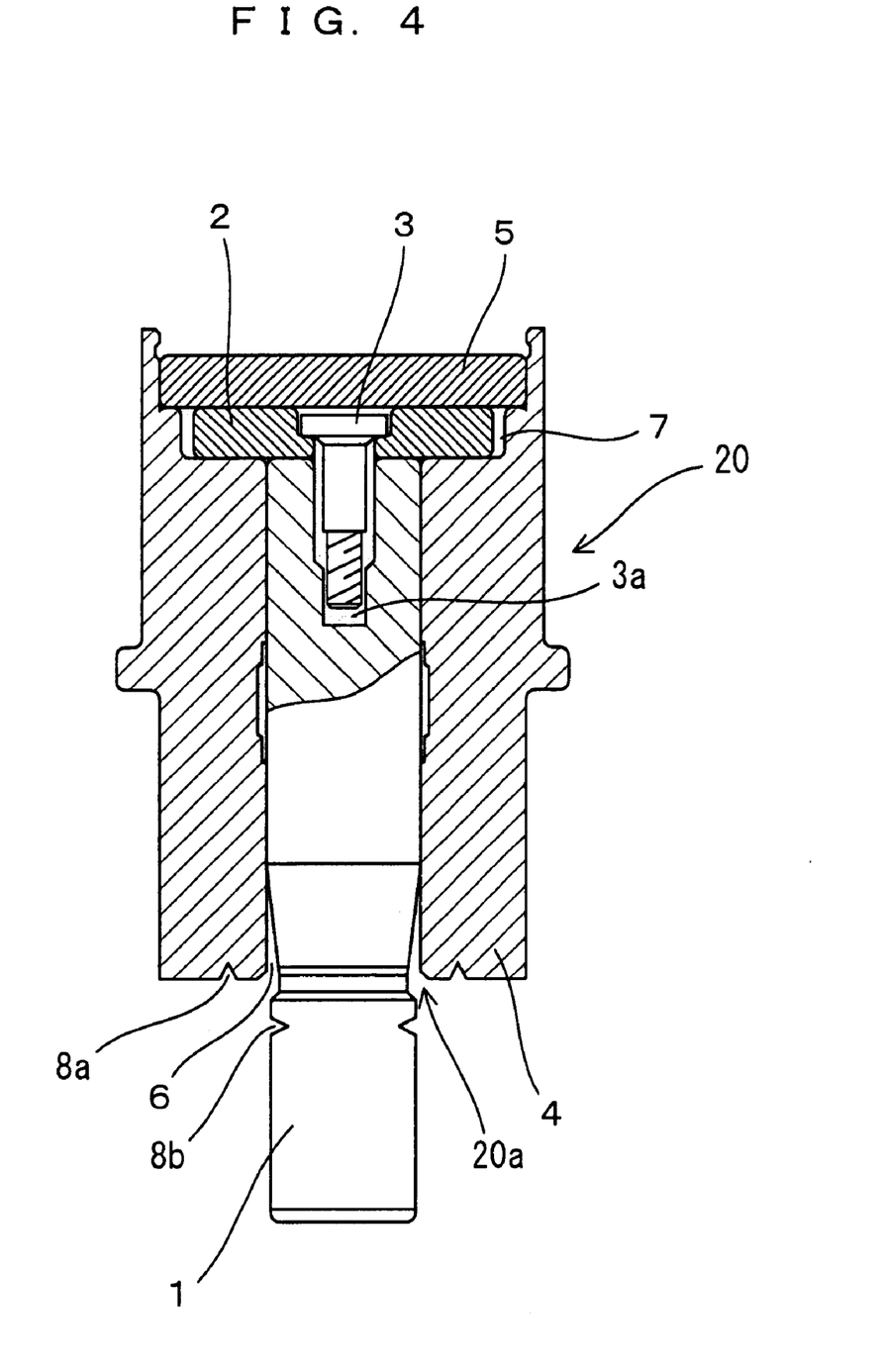
FIG. 4 is a longitudinal sectional view showing a dynamic pressure bearing device which is different in configuration from FIG. 2.

Further, when the chamfered part 6a is not formed with a sufficient size for storing the proper amount of oil, as shown in FIG. 4, ring-shaped grooves 8a and 8b are formed along the open end 20a of the bearing unit 20 to prevent the spread of the lubricating oil 7.

Figure 5:
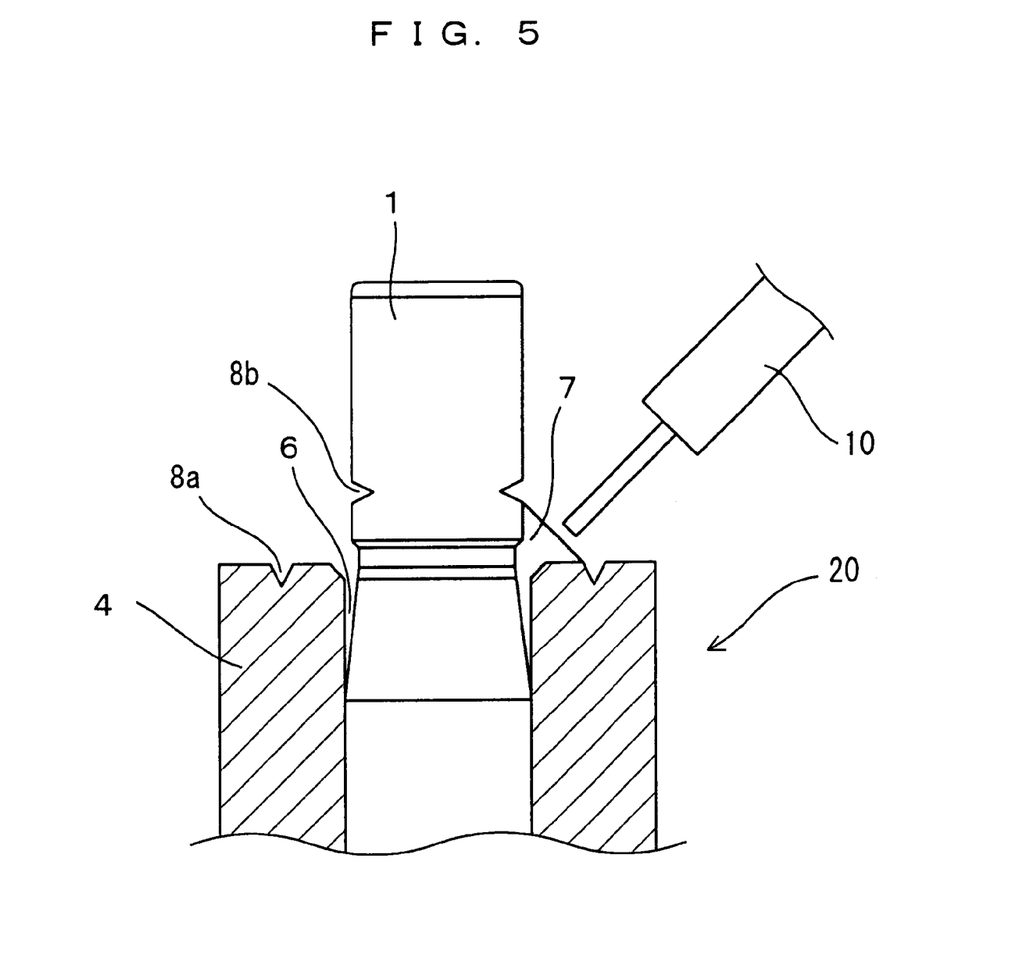
FIG. 5 is an enlarged sectional view for explaining a main part of FIG. 4.

When such ring-shaped grooves 8a and 8b are formed, as shown in FIG. 5, the spread of the lubricating oil 7 dropped from the dispenser 10 is stopped at the ring-shaped grooves 8a and 8b. Hence, the prescribed amount of the lubricating oil 7 can be readily supplied by setting the forming positions of the ring-shaped grooves 8a and 8b depending upon the prescribed amount of the lubricating oil 7. Further, since unnecessary spread of the lubricating oil 7 is prevented, it is possible to eliminate the necessity for wiping the lubricating oil 7.

Further, in the above explanation, the ring-shaped grooves 8a and 8b are formed on both of the sleeve 4 and the shaft 1. The grooves 8a and 8b may be formed on one of the sleeve 4 and the shaft 1.

As described above, according to the manufacturing method of the dynamic pressure bearing device of the present invention, a bearing unit is exposed in an atmosphere of reduced pressure to evacuate air in a gap, a proper amount of lubricating oil is dropped to the open end of the gap of the bearing unit, and then, the bearing unit is released to the atmosphere to fill the lubricating oil in the gap. Thus, the lubricating oil can be readily injected into the bearing unit without leaving air bubbles in the unit.

Moreover, according to the dynamic pressure bearing device of the present invention, a concave part for determining a proper amount of oil is formed on the open end of the gap between a bearing body and a shaft body of the bearing unit to perform the above-described manufacturing method. Hence, the proper amount of lubricating oil can be readily dropped into the bearing unit without short or excessive supply.

Additionally, the above explanation discussed an example in which a single bearing unit 20 is placed in the vacuum chamber 9 to fill the lubricating oil 7. In the present invention, lubrication can be continuously performed on a plurality of the bearing units 20.

Figure 6:
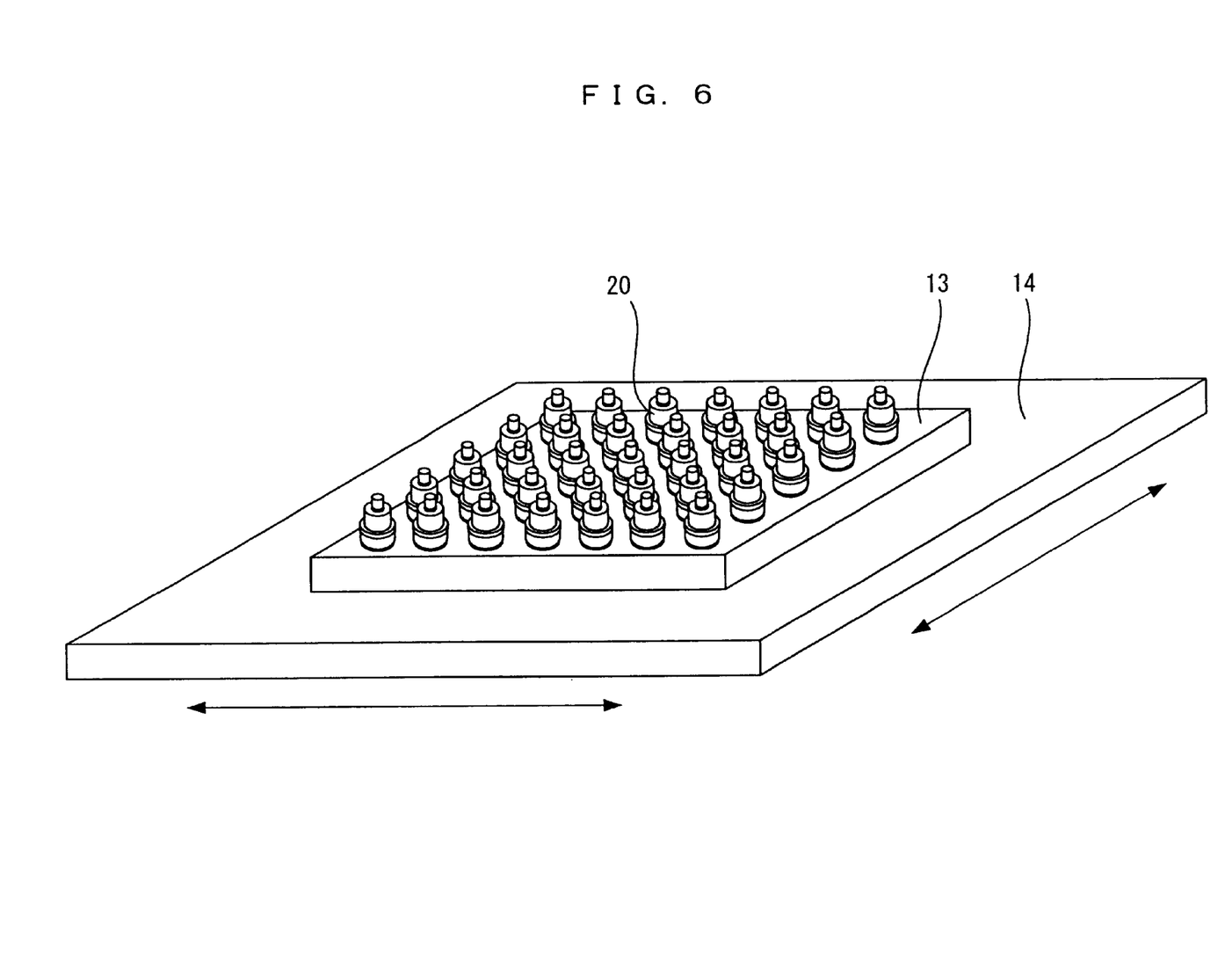
FIG. 6 is a perspective view for explaining continuous filling of lubricating oil to the bearing unit.

For example, as shown in FIG. 6, a plurality of the bearing units 20 are set on a pallet 13 having a supporting part of the bearing units 20 thereon, and the pallet 13 is placed on an XY stage 14, which is provided in the vacuum chamber 9 configured as FIG. 1 and can be driven in X direction and Y direction.

And then, when the lubricating oil 7 is injected, the XY stage 14 is driven in accordance with a position of supplying the lubricating oil 7 from the dispenser 10. Thus, lubrication can be continuously performed on the plurality of the bearing units 20 mounted on the pallet 13, thereby remarkably improving production efficiency.

Figure 7:
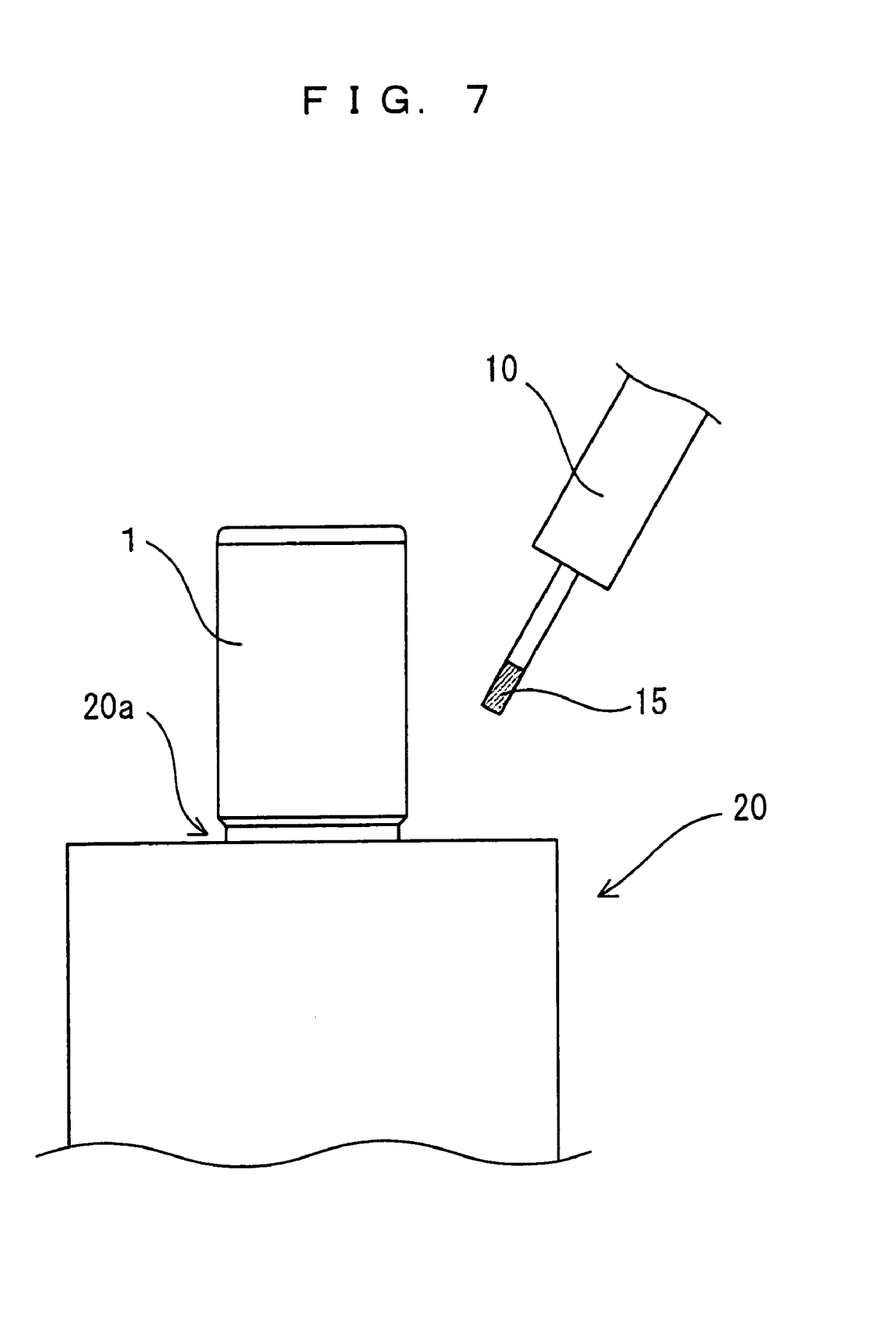
FIG. 7 is an enlarged schematic diagram for explaining a supply side of lubricating oil.

Such continuous lubrication to the bearing units 20 may cause the lubricating oil 7 to adhere to the nozzle leading end of the dispenser 10, gradually grow a ball of the lubricating oil 7 thereon, and cause the lubricating oil 7 adhere to a part of the bearing unit 20 where the lubricating oil 7 is not necessary. As shown in FIG. 7, since oil repellent agent 15 is applied in advance on the nozzle leading end of the dispenser 10, the lubricating oil 7 can be shed satisfactorily so as to achieve better continuous lubrication of the lubricating oil 7.

Besides, in the above explanation and drawings, only a single dispenser 10 or nozzle is provided. A plurality of dispensers 10 may be used. When a single dispenser 10 having a plurality of nozzles is used, production efficiency can be further improved.

Moreover, in the above explanation, the position of the dispenser 10 is fixed and the XY stage 14 having the bearing units 20 thereon is moved with respect to the dispenser 10. The bearing unit 20 may be fixed and the dispenser 10 may be driven to perform lubrication.

What is claimed is:

1. A dynamic pressure bearing device, comprising:
   a bearing body and a shaft body having a gap therebetween for receiving lubricating oil, the bearing body and the shaft body forming a bearing unit having one end closed and the other end opened and
   a ring-shaped concave part having a volume substantially equal to a quantity of lubricating oil located adjacent an open end of said gap.

2. The device according to claim 1, wherein said ring-shaped concave part is located on at least one of said shaft body and said bearing body.

3. The device according to claim 1, wherein said ring-shaped concave part comprises a chamfered part surrounding an opening of a shaft body insertion hole of said bearing body, said chamfered part located along said open end of said gap of said bearing unit, and a space at a position connected to said chamfered part and extending to a point where an outer periphery of said shaft body and an inner periphery of said bearing body are close to each other, whereby a sum of a chamfered volume of said chamfered part and a volume of said space is substantially equal to said quantity of lubricating oil.

4. The dynamic pressure bearing device according to claim 3, wherein said bearing unit comprises an open side having ring-shaped grooves thereon for preventing lubricating oil from spreading.

5. A method for lubricating a dynamic pressure bearing device that comprises a bearing body and a shaft body forming a bearing unit, said bearing body and shaft body having a gap therebetween, said method comprising:
   reducing the atmospheric pressure in the gap to a pressure below ambient pressure;
   supplying a quantity of lubricating oil adjacent said gap; and
   returning the atmospheric pressure in the gap to ambient pressure, thereby causing said lubricating oil to fill said gap;
   placing a plurality of bearing units on a pallet; and
   moving said pallet and a supply side of said lubricating oil to continuously supply said lubricating oil to said bearing units.

6. The method according to claim 5, wherein said supplying further comprises supplying a quantity of lubricating oil to a ring-shaped concave part having a volume substantially equal to said quantity of lubricating oil located adjacent an open end of said gap.

7. The method according to claim 5, further comprising:
   supplying lubricating oil with a dispenser comprising a nozzle having an oil repellent agent on a leading end thereof.

* * * * *